June 22, 1954     F. A. KRUSEMARK     2,681,700
WINDSHIELD VISOR ASSEMBLY
Filed Feb. 23, 1951     2 Sheets-Sheet 1
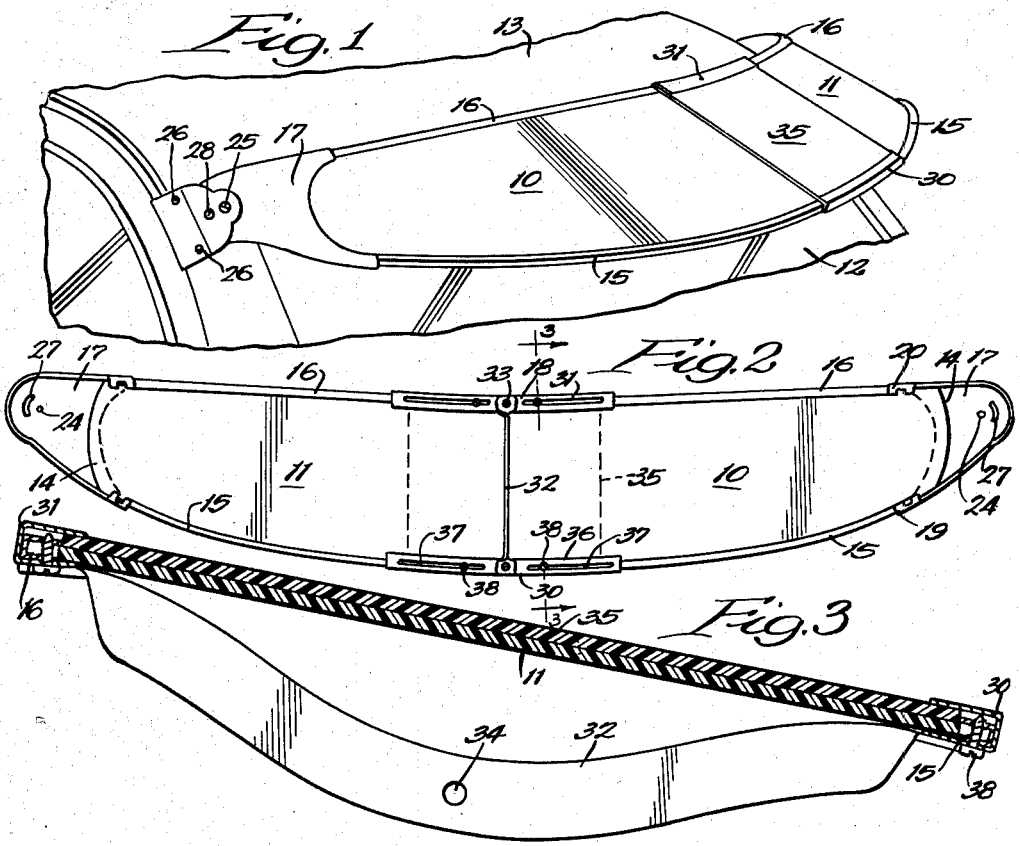
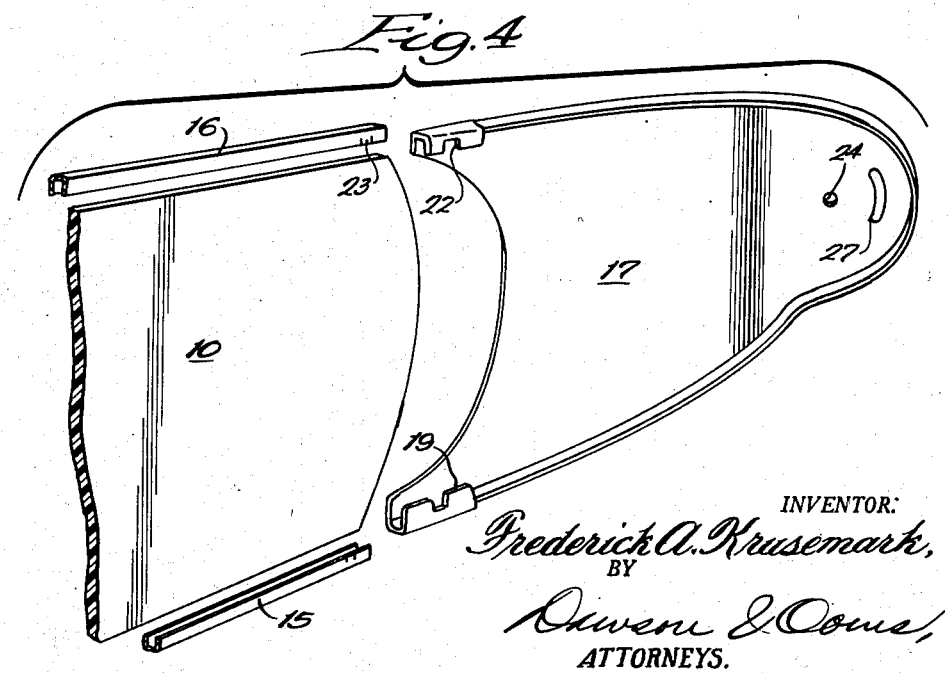
INVENTOR:
Frederick A. Krusemark,
BY
Owen & Owen,
ATTORNEYS.

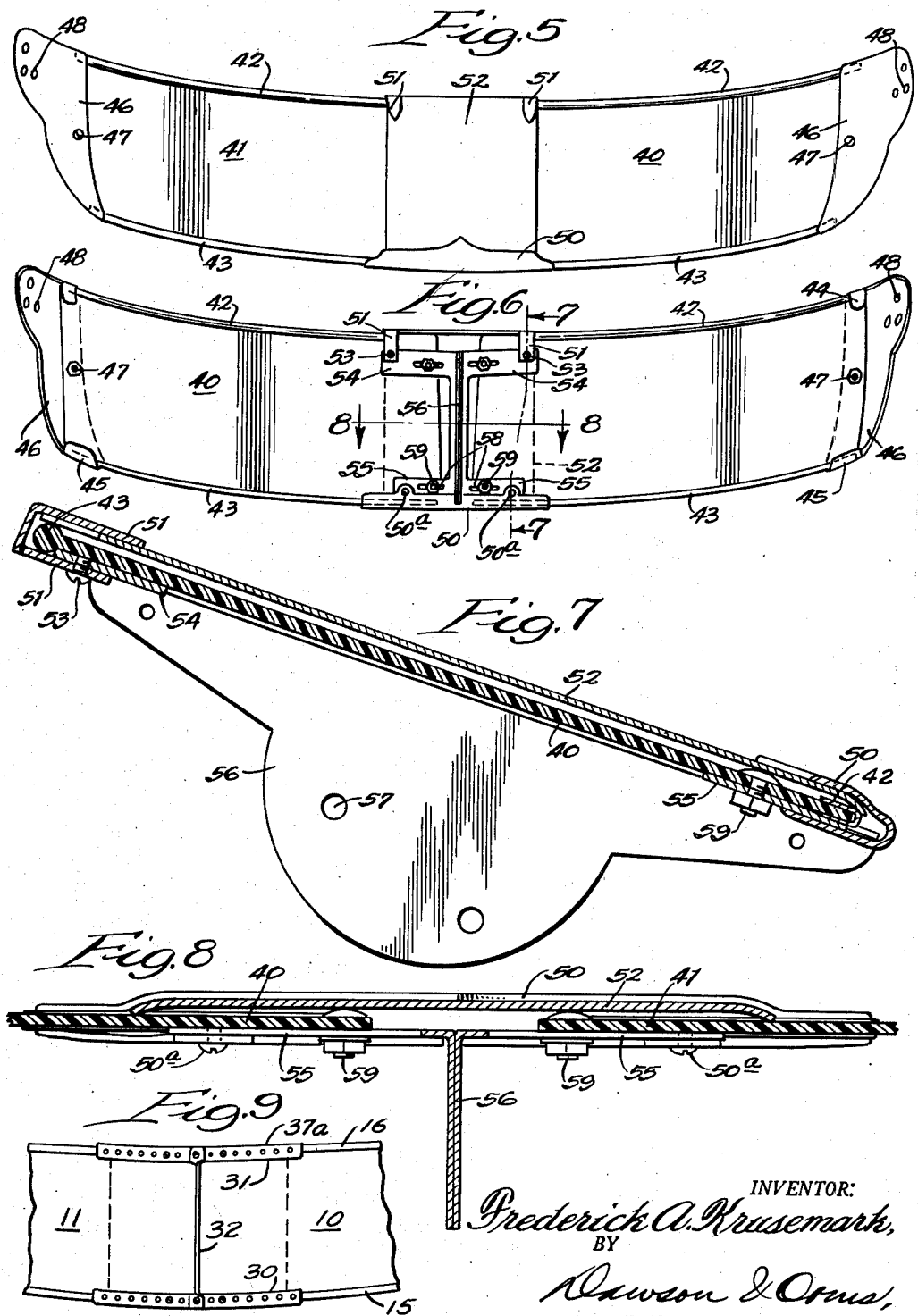

Patented June 22, 1954

2,681,700

UNITED STATES PATENT OFFICE 2,681,700

WINDSHIELD VISOR ASSEMBLY

Frederick A. Krusemark, Oak Park, Ill., assignor to Santay Corporation, Chicago, Ill., a corporation of Illinois Application February 23, 1951, Serial No. 212,384

5 Claims. (Cl. 160—222)

This invention relates to visor assemblies for use on automotive vehicles and it relates more particularly to a visor assembly which makes use of a transparent plastic or glass window member and to a new and improved mounting for same on the outside of the automotive vehicle.

An objectionable feature which often arises in the manufacture and use of a visor assembly having a plastic or the like window member reinforced and supported with metallic parts resides in the development of strains and stresses which often lead to breakage or distortion responsive to differences in expansion and contraction of the various materials with changes in temperature and humidity conditions while in position of use. Such differences in expansion and contraction are inherent in the materials of which the visor unit is formed. As a result, it is expedient to provide for flexibility in the assembly without loss of rigidity or weakening of the assembled relation to compensate for such differences in expansion and contraction while in position of use and it is an object of this invention to produce a visor assembly of the type described which embodies such features for compensating for the differences in expansion and contraction of the materials of which it is formed.

Another object of this invention is to produce a visor assembly for automotive vehicles characterized by freedom of strain in the assembled relation notwithstanding the differences in expansion and contraction of the various materials of which it is formed.

Another object is to produce a visor assembly having a transparent window member of fragile or distortable material supported in a rigid frame but with sufficient freedom in relative movement to minimize the development of strain responsive to differences in expansion between the window member and its supporting parts when in the assembled relation.

A further object is to produce a visor assembly of the type described which minimizes distortion and breakage of the more fragile visor member or elements when in the assembled relation and it is a related object to produce a visor assembly of the type described which is adequately reinforced in the assembled relation to resist the forces to which it might be subjected as an incidence to normal use.

A still further object is to produce a visor assembly of the type described which embodies adjustable means for mounting the assembly to correspond to the width of the vehicle and the contour of the vehicle.

A still further object is to produce a new and improved visor assembly for automotive vehicles and means for adjustably and securely mounting same on the exterior thereof.

These and other objects and advantages of this invention will hereinafter appear and for purposes of illustration, but not of limitation, embodiments of the invention are shown in the accompanying drawings in which—

Figure 1 is a perspective fragmentary view of a visor assembly embodying features of this invention and in position of use over the windshield of the automotive vehicle;

Figure 2 is a plan view taken of the visor member shown in Figure 1 from the under side;

Figure 3 is a sectional view taken along the line 3—3 of Figure 2;

Figure 4 is a perspective fragmentary view of the end members forming a part of the visor assembly illustrated in relative position for assembly;

Figure 5 is a top view of a modified form of visor assembly embodying features of this invention;

Figure 6 is a plan view from the under side of the visor assembly shown in Figure 5;

Figure 7 is a sectional view taken substantially along the line 7—7 of Figure 6;

Figure 8 is a sectional view taken substantially along the line 8—8 of Figure 6, and Figure 9 is a plan view showing a modified form of channel member.

As shown in Figures 1-4 of the drawing, a visor assembly embodying features of this invention comprises a pair of elongate window sections 10 and 11 which may be formed of metal, plastic or glass sheet stock but preferably is formed of transparent plastic or glass material which may be colorless or of a color to filter light and heat rays. The window members may be formed of flat sheet stock or else molded to desired curvilinear shape to correspond with the streamlining effect of the windshield 12 and other parts of the automotive vehicle 13. The window members 10 and 11 are arranged in end to end spaced relation with the adjacent inner portions of the window members having the widest dimension and then tapering downwardly towards the outer end portion and then finally terminating in a rounded end section 14.

The forward and rearward edge portions of the window members slidably seat within channel strips 15 and 16 respectively, formed of metal or the like material.

The desired spaced relation between channel strips 15 and 16 is maintained, when in the assembled relation, by an adapter 17 which operatively engages the outer ends of the channel strips 15 and 16 and a center connecting bracket 18 which operatively engages and determines the spaced relation of the inner ends of the channel strips 15 and 16.

The adapter 17 may be formed of sheet metal or the like having channel sections 19 and 20 formed at the inner ends in spaced relation corresponding to the desired distance between the corresponding end portions of the channel strips 15 and 16 when in the mounted relation. The end portions of the channel strips 15 and 16 seat within the channel sections 19 and 20 of the adapter and means are provided for interconnecting the channel strips, when in the assembled relation, to prevent relative movement. As shown in Figures 2 and 4, such means may comprise a cutout section 22 in an intermediate portion of the inner wall of the channel sections 19 and 20 adapted to be in alignment with split sections 23 in the channel strips 15 and 16, when in the assembled relation, to enable the split sections 23 to be turned outwardly to seat within the cutouts 22. It will be understood that other means for connecting the channel strips to effect the desired assembly may be employed, such for example, as bolts, nuts, rivets or the like for temporary assembly or welding and the like for permanent assembly.

The curvilinear outer end portion of the adapter has an opening 24 which receives a mounting screw or bolt 25 for attaching the adapter to the mounting bracket 26. In order to permit adjustment of the adapter with respect to its mounting bracket for properly mounting the bracket on the vehicle 13 and for properly positioning the visor assembly with respect to the bracket, the adapter is provided with a curvilinear slotted portion 27 which receives mounting screw 28 to permit relative circumferential movement about screw 25 as the pivot. A mounting bracket suitable for use in the assembly shown for securing the visor assembly onto the gutter of the automotive vehicle or interchangeably onto the door post is shown and described in my copending application Ser. No. 186,785, filed on September 26, 1950, and entitled "Visor Mounting Bracket."

The inner end portions of the channel strips 15 and 16 telescope or are slidably received in another pair of channel members 30 and 31 formed of metal or the like having their greatest spaced apart relation intermediate the ends and fixed in the spaced relation by a metallic cross-brace 32 secured to the channel members intermediate their ends by screws 33 or the like. The cross-brace 32 extends from the under side of the assembly and is provided with means, such as an opening 34 intermediate its ends for connection to a rod or bracket which braces the central portion of the visor assembly onto a part of the automotive vehicle.

Seated within the channel members 30 and 31 and dimensioned to overlap the spaced inner ends of the window sections 10 and 11 in all positions of adjustment, is a center cover plate 35 which may be formed of sheet metal or the like but, for purposes of visability, it is preferably formed of transparent plastic or glass material. The cover plate 35 is contoured to correspond with that of the channel members 30 and 31 so as to prevent disconnection when in the assembled relation.

In order to permit relative endwise adjustment of the parts to adapt the assembly for variable widths demanded by the automotive vehicle with which it is to be used, the inner flanges 36 of the channel members 30 and 31 are provided with elongate slots 37 and screws 38 extend through the slots and attach to the inner end portions of the channel strips 15 and 16 to secure the strips 15 and 16 with channel members 30 and 31 when properly adjusted for the width of the vehicle. The edge portions of the window sections 10 and 11 are cut away to clear the screws 38 as shown in Figure 3 so that the window sections are free floating in the channel strips. Movement of the window sections toward the center support will be limited, however, by the ends of the cut away portions striking the fastenings 38, the clearance being sufficient to accommodate expansion of the window sections but insufficient to allow the window sections to move away from overlapping relation with the end supports. The edges of the plate 35 are preferably also cut away to clear the fastenings 38 so that the channel strips and window sections can be adjusted in the channels 30 and 31 and the plate 35 can move in the channels 30 and 31 during expansion and contraction. The depth of the channel strips and channel members are calculated to embrace the window members and plates 10, 11 and 35 to effect a guiding and supporting relation when in position of use notwithstanding differences in the amount of expansion and contraction which takes place.

Instead of providing slots 37 in the channel members 30 and 31 for adjustment for width, spaced openings 37ᵃ may be provided, as shown in Figure 9. The securing screw is inserted through the proper opening to fix the relative positions when the parts have been adjusted for width.

It will be apparent from the description that the window visor sections 10 and 11 and their supporting channel strips 15 and 16 are adjustable endwise relative to each other and to the center plate section 35. Since the screws 38 are secured to the channel strips 15 and 16 the clearance between the screws and the cut out edge portions of the window sections 10 and 11 will remain constant in all adjusted positions. Since the channel strips 15 and 16 converge toward the end supports 17, the window sections cannot move outward. Thus the window sections are held properly positioned while being able to float in the channels to accommodate differences in expansion and contraction. Relative movement in the endwise directions is also permitted between plate 35 and its supporting channel members 30 and 31 to compensate for differences in expansion and contraction. As a result, strains which might build up between elements rigidly secured one to another are avoided so that breakage and distortion will not exist.

A preferred modification embodying features of this invention is shown in Figures 5–8 inclusive. In this modification each of a pair of window sections 40 and 41 formed of plastic, metal or the like material may be held within and reinforced by channel strips, such as channel strip 43, or the edge sections may be strengthened sufficient to resist forces incident to normal use by molding ribs therein, such as indicated by numeral 42. As shown in the drawing, a preferred modification makes use of the reinforcing metal strip 43 adjacent the vehicle body and the reinforcing rib 42 at the forward edge. The outer end portions of the window sections are slidably engaged within channel sections 44 and 45 arranged on the inner end portion of an adapter 46 secured to the outer end portion of the corresponding window section by a nut and bolt assembly 47 to establish a fixed relation. The channel sections 44 and 45 are spaced apart by a distance corresponding to the forward and rearward edge portions of the window section adapted to be embraced thereby when in the assembled relation. The outer end of the adapter 46 is provided with means, such as bolt openings 48 for attaching to a mounting bracket, such as previously described.

It will be apparent from the description thus far that the outer end portion of the window sections 40 and 41 may be fixed to prevent relative movement with the adapter 46 or the automotive vehicle to which it is attached.

The inner end portions of the window sections 40 and 41 are free for relative endwise adjustment responsive to differences in expansion and contraction without disrupting the assembled relation. For this purpose the inner end of each window panel, whether formed with a reinforcing bead 42 along the outer edges or provided with reinforcing channel strips 43, is received in a manner to permit longitudinal sliding movement within U-shaped members 50 and 51. U-shaped channel member 50 may be formed integral with the edge of the central cover plate 52 or it may be secured, as by screws 50ª to a cross piece 55 extending laterally from a brace 56 across the back of the cover plate 52 and in spaced relation therewith. The forward end portion of the channel member 50, when so mounted, is adapted to extend over the adjacent front wall of the plate 52. U-shaped adapters 51 are pivoted at one end from the outer end portions of cross pieces 54 extending from the other end of brace 56. The free arm of the adapter engages the front wall of the plate. The cover plate 52 may be formed of transparent plastic or the like material or it may be formed of sheet metal and the like. Brace 56 has means, such as openings 57, therein for attachment to a supporting rod and bracing the intermediate portion of the visor assembly onto the vehicle.

The cross pieces 54 and 55 are provided with elongate slots 58 which receive screw members 59 in guiding relation and which attach, as shown in Figure 7, to the inner end portion of the window panels 40 and 41. The windows panels are thus fixed in their assembled relation to the center cover plate but in a manner to permit relative endwise movement so as to compensate for differences in expansion and contraction which might occur.

It will be evident also that the large window sections 40 and 41 are free to shift relative to channel strips 42, when employed, to compensate for differences in expansion and contraction which might occur therebetween. It will be evident that relative movements between window sections and channel strip 42 is also permissible to militate against the development of strain responsive to differences in expansion and contraction.

It will be manifest from the description that I have provided a new and improved visor assembly for mounting on the outside of automotive vehicles providing means for assembling parts in their assembled relation while permitting such relative movement between dissimilar materials of which the visor assembly is formed to minimize the development of strain and distortion of parts responsive to differences of expansion. The visor assembly, notwithstanding such provisions for relative movement, constitutes a sturdy unit capable of maintaining the assembled relation under all conditions of use while permitting adjustment for size to correspond with the width of the automotive vehicle.

It will be understood that numerous changes may be made in the details of construction, arrangement and operation without departing from the spirit of the invention, especially as defined in the following claims.

I claim:

1. A visor assembly for use on the outside of an automotive vehicle above the windshield thereof, said visor assembly comprising metal outer end supports adapted to be secured to the sides of the vehicle adjacent to the ends of the windshield, a center support adapted to be secured to the center part of the vehicle to lie spaced above the center portion of the windshield, front and rear metal channel strips connecting each of the end supports to the center support and lying in spaced relation with their channels opening toward each other, window sections of non-metallic material having their front and rear edges fitting slidably in the channel strips with their ends in overlapping relationship with the end and center supports, and means on the channel strips and the window sections to limit relative sliding therebetween while allowing the window sections to slide in the channels to accommodate differences in expansion and contraction of the metal channel strips and the non-metallic window sections.

2. A visor assembly for use on the outside of an automotive vehicle above the windshield thereof, said visor assembly comprising metal outer end supports adapted to be secured to the sides of the vehicle adjacent to the ends of the windshield, a center support adapted to be secured to the center part of the vehicle to lie spaced above the center portion of the windshield, front and rear metal channel strips connecting each of the end supports to the center support and lying in spaced relation with their channels opening toward each other, window sections of non-metallic material having their front and rear edges fitting slidably in the channel strips with their ends in overlapping relationship with the end and center supports, and fastening means securing one end of each window section to the adjacent support to hold the window section against movement at one point while leaving it free to float in the channels throughout the major part of its periphery.

3. A visor assembly for use on the outside of an automotive vehicle above the windshield thereof, said visor assembly comprising metal outer end supports adapted to be secured to the sides of the vehicle adjacent to the ends of the windshield, a center support adapted to be secured to the center part of the vehicle to lie spaced above the center portion of the windshield, front and rear metal channel strips connecting each of the end supports to the center support and lying in spaced relation with their channels opening toward each other, window sections of non-metallic material having their front and rear edges fitting slidably in the channel strips with their ends in overlapping relationship with the end and center supports, the center support including inwardly opening metal channels receiving the inner ends of the channel strips and window sections, and a sheet of non-metallic material fitting slidably in the channels and overlapping the adjacent ends of the window sections.

4. A visor assembly for use on the outside of an automotive vehicle above the windshield thereof, said visor assembly comprising metal outer end supports adapted to be secured to the sides of the vehicle adjacent to the ends of the windshield, a center support adapted to be secured to the center part of the vehicle to lie spaced above the center portion of the windshield, front and rear metal channel strips connecting each of the end supports to the center support and lying in spaced relation with their channels opening toward each other, window sections of non-metallic material having their front and rear edges fitting slidably in the channel strips with their ends in overlapping relationship with the end and center supports, the central support including inwardly opening channels into which the adjacent ends of the channel strips slidably fit, and means to secure the channel strips to the channels in any one of a plurality of positions whereby the length of the visor assembly can be adjusted.

5. A visor assembly for use on the outside of an automotive vehicle above the windshield thereof, said visor assembly comprising metal outer end supports adapted to be secured to the sides of the vehicle adjacent to the ends of the windshield, a center support adapted to be secured to the center part of the vehicle to lie spaced above the center portion of the windshield, front and rear metal channel strips connecting each of the end supports to the center support and lying in spaced relation with their channels opening toward each other, window sections of non-metallic material having their front and rear edges fitting slidably in the channel strips with their ends in overlapping relationship with the end and center supports, the central support including inwardly opening channels slidably receiving the adjacent ends of the channel strips, a central panel fitting at its edges in the channels and overlapping the adjacent ends of the window sections, and fastening means to secure the channel strips to the channels in any one of a plurality of positions whereby the length of the visor assembly can be adjusted.

References Cited in the file of this patent

UNITED STATES PATENTS

| Number | Name | Date |
|---|---|---|
| 827,483 | Voorhees | July 31, 1906 |
| 2,334,856 | Atkinson | Nov. 23, 1943 |
| 2,500,406 | Greenfield | Mar. 14, 1950 |
| 2,497,050 | Thibault | Feb. 7, 1950 |
| 2,506,108 | Riemann et al. | May 2, 1950 |
| 2,614,628 | Riemann | Oct. 21, 1952 |